(12) United States Patent
Kou et al.

(10) Patent No.: US 10,330,213 B2
(45) Date of Patent: Jun. 25, 2019

(54) ELECTROMECHANICAL-LINKAGE HYDRAULIC CONTROL GATE VALVE ACTUATOR

(71) Applicant: Taiyuan University of Technology, Taiyuan, Shanxi (CN)

(72) Inventors: Ziming Kou, Shanxi (CN); Guijun Gao, Shanxi (CN); Yanfei Kou, Shanxi (CN); Gongjun Cui, Shanxi (CN); Jing Zhang, Shanxi (CN); Hao Qin, Shanxi (CN); Sijia Meng, Shanxi (CN); Jing Liu, Shanxi (CN); Liangji Zhao, Shanxi (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 16/133,430

(22) Filed: Sep. 17, 2018

(65) Prior Publication Data

US 2019/0017618 A1    Jan. 17, 2019

Related U.S. Application Data

(63) Continuation of application No. PCT/CN2016/089716, filed on Jul. 12, 2016.

(30) Foreign Application Priority Data

Mar. 30, 2016   (CN) .......................... 2016 1 0189850

(51) Int. Cl.
*F16K 47/02* (2006.01)
*F16K 31/05* (2006.01)
(Continued)

(52) U.S. Cl.
CPC .......... *F16K 31/05* (2013.01); *F15B 11/0325* (2013.01); *F15B 13/025* (2013.01);
(Continued)

(58) Field of Classification Search
CPC ...... F16K 3/0254; F16K 31/047; F16K 31/05; F16K 31/143; F16K 31/53; F16K 47/02;
(Continued)

(56) References Cited

U.S. PATENT DOCUMENTS 1,908,763 A    5/1933   Kelty
3,324,741 A *  6/1967   Anderson ............... E21B 33/06
                                                 251/71
(Continued)

FOREIGN PATENT DOCUMENTS

CN           1036628 A   10/1989
CN        201475381 U    5/2010
(Continued)

*Primary Examiner* — Matthew W Jellett
(74) *Attorney, Agent, or Firm* — Wayne & Ken, LLC; Tony Hom (57) ABSTRACT

Provided is an electromechanical-linkage hydraulic control gate valve actuator. The actuator includes a hand-operated speed-increasing gearbox assembly and a bidirectional throttle valve. In the present invention, a motor is driven to rotate through the hand-operated speed-increasing gearbox and thus a hydraulic system is driven to finally open and close a gate valve. An opening and closing speeds of the gate valve can be regulated and controlled through the bidirectional throttle valve. The present invention drives the motor through the hand-operated speed-increasing gearbox under emergency conditions such as repair and power failure, thereby controlling to open and close the gate valve. Meanwhile, a hydraulic system respectively regulates the speeds of two states of opening and closing through a bidirectional throttling technique, so as to effectively eliminate a water hammer phenomenon. The present invention has simple structure, light weight and modular installation, and enhances safety and reliability.

1 Claim, 6 Drawing Sheets

(51) Int. Cl.
*F16K 3/02* (2006.01)
*F15B 15/06* (2006.01)
*F15B 13/02* (2006.01)
*F15B 15/08* (2006.01)
*F15B 11/032* (2006.01)
*F16K 31/143* (2006.01)
*F16K 31/53* (2006.01)
*F16K 31/04* (2006.01)

(52) U.S. Cl.
CPC .......... *F15B 15/065* (2013.01); *F15B 15/088* (2013.01); *F16K 3/0254* (2013.01); *F16K 31/047* (2013.01); *F16K 31/143* (2013.01); *F16K 31/53* (2013.01); *F16K 47/02* (2013.01); *F16K 47/023* (2013.01)

(58) Field of Classification Search
CPC .. F16K 47/023; F15B 11/0325; F15B 13/025; F15B 15/065; F15B 15/088
See application file for complete search history.

(56) References Cited

U.S. PATENT DOCUMENTS

| | | | | |
|---|---|---|---|---|
| 3,685,790 A | * | 8/1972 | Crowe | F16K 31/003 251/67 |
| 3,921,264 A | * | 11/1975 | Madonian | F16H 57/10 475/154 |
| 3,979,971 A | * | 9/1976 | Generke | F16H 37/0826 475/7 |
| 4,300,351 A | * | 11/1981 | Grullmeier | B30B 15/165 60/560 |
| 4,565,116 A | * | 1/1986 | Hehl | B29C 45/6771 425/135 |
| 6,102,828 A | * | 8/2000 | MacKenzie | E21B 33/0355 475/263 |
| 6,978,609 B2 | * | 12/2005 | Busch | E05F 3/223 60/460 |
| 8,408,518 B2 | * | 4/2013 | Schade | F16K 31/047 251/129.12 |
| 2004/0028543 A1 | * | 2/2004 | Rapp | F15B 11/0325 417/417 |
| 2015/0219124 A1 | * | 8/2015 | Kim | F15B 13/029 60/371 |

FOREIGN PATENT DOCUMENTS

| | | |
|---|---|---|
| CN | 101782047 A | 7/2010 |
| CN | 201875254 U | 6/2011 |
| CN | 102155444 A | 8/2011 |
| CN | 104595553 A | 5/2015 |
| CN | 204828870 U | 12/2015 |
| CN | 105370904 A | 3/2016 |
| CN | 105736796 A | 7/2016 |
| FR | 2250944 A1 | 6/1975 |
| JP | 2631635 B2 | 7/1997 |

* cited by examiner

ELECTROMECHANICAL-LINKAGE HYDRAULIC CONTROL GATE VALVE ACTUATOR

CROSS-REFERENCE TO RELATED APPLICATIONS

This application is a continuation of International Application No. PCT/CN2016/089716 with a filing date of Jul. 12, 2016, designating the United States, now pending, and further claims to Chinese application No. 201610189850.X with a filing date of Mar. 30, 2016. The content of the aforementioned applications, including any intervening amendments thereto, are incorporated herein by reference.

TECHNICAL FIELD

The present invention relates to an electric and hydraulic control gate valve actuator, and particularly relates to a mechanically-driven and hydraulically-controlled electro-hydraulic gate valve actuating device used in underground mines.

BACKGROUND OF THE PRESENT INVENTION

A mine drainage system is an important part of mine safety production. A centrifugal water pump is usually used in the drainage system. A gate valve is an essential element in this system. A traditional electro-hydraulic gate valve actuating device is mainly composed of a motor, a hydraulic cylinder, a hydraulic pump and a hydraulic valve. The electro-hydraulic gate valve actuating device with this structure may generate the following problems during application: (1) emergency opening/closing functions are poor; for example, the electro-hydraulic gate valve actuating device cannot be operated normally in case of repair or sudden power failure; and (2) opening and closing speeds of the gate valve are inconvenient in automatic regulation, and a water hammer phenomenon is easily generated.

In a hydraulic controllable gate valve disclosed with publication number of CN200510048257, the gate valve is opened and closed by means of rotary motion of a lead screw driven by a hydraulic motor, but this rotary motion is still traditional output rotary motion, not direct-push output. An emergency function is not set, and bidirectional speed regulation of opening and closing cannot be realized.

In a gate valve electro-hydraulic drive system with the function of emergency valve closing and a gate valve disclosed with publication number of CN204828870U, the gate valve electro-hydraulic drive system includes a motor, a hydraulic pump, an integrated control valve, an accumulator actuating oil cylinder and a hydraulic oil tank. A manual pump is adopted for manual control. Although this system has the function of emergency valve closing, this system cannot achieve bidirectional speed regulation of opening and closing of the gate valve.

Therefore, it is very important to design a gate valve actuator having compact structure and capable of being used in emergency sudden situations and eliminating a water hammer by means of bidirectional speed regulation of opening and closing.

SUMMARY OF THE PRESENT INVENTION

Based on the above specific technical problems in the prior art, the present invention provides an electromechanical-linkage hydraulic control gate valve actuator.

The specific technical solution of the electromechanical-linkage hydraulic control gate valve actuator provided above is as follows.

An electromechanical-linkage hydraulic control gate valve actuator includes an explosion-proof motor, a hydraulic control gate valve and an actuator rack, wherein a hand-operated speed-increasing gearbox assembly is added; a sun gear is connected with a shaft of the explosion-proof motor through the hand-operated speed-increasing gearbox assembly; a bidirectional throttle valve is added and installed in a lower part of the actuator rack; and one end of the bidirectional throttle valve is communicated with a hydraulic oil cylinder, and the other end is communicated with a hydraulic control check valve.

In the hand-operated speed-increasing gearbox assembly, the sun gear is disposed on a central line at one end of a planet carrier body and is connected with the shaft of the explosion-proof motor; a central line at the other end of the planet carrier body is connected with a handle through a bearing II; and planetary gears are symmetrically disposed on both sides of the planet carrier body, and are engaged with an internal gear fixed to a hand-operated speed-increasing gearbox shell through two planetary gear shafts.

In the above technical solution, further technical features are as follows.

The planetary gears symmetrically disposed on both sides revolve around the central line of the internal gear, and rotate around the planetary gear shafts.

The two planetary gears, the sun gear, the two planetary gear shafts and the internal gear respectively have tooth numbers of 29, 10, 8 and 48, and have moduli of 2.

The hand-operated speed-increasing gearbox assembly has a speed-increasing ratio of 18.5.

Opening and closing speeds of the gate valve are regulated and controlled through the bidirectional throttle valve.

The electromechanical-linkage hydraulic control gate valve actuator provided above by the present invention solves the problem of normal operation of an existing electro-hydraulic gate valve under emergency conditions such as repair and power failure, and also solves the problem that speed cannot be regulated separately when the existing electro-hydraulic gate valve is turned on and turned off. A small hand-operated speed-increasing gearbox is connected with the motor, so that the structure is compact and operation is simple reliable. The bidirectional throttle valve is installed in the lower part of the actuator rack, thereby realizing separate speed regulation when turning on and turning off. The structure effectively avoids a water hammer phenomenon of the hydraulic control gate valve, and further improves safety and stability of application of the gate valve.

In the figures: 1: hydraulic control gate valve; 2: explosion-proof motor; 3: actuator rack; 4: hand-operated speed-increasing gearbox assembly; 5: bidirectional throttle valve; 6: hand-operated speed-increasing gearbox shell; 7: bearing I; 8: framework oil seal; 9 bearing II; 10: planet carrier body; 11: planetary gear; 12: planetary gear shaft; 13: planet carrier plate; 14: stop ring; 15: retaining ring for shaft; 16: button; 17: sun gear; 18: internal gear; 19 inner hexagon screw; 20: countersunk head screw; and 21 cushion cover.

DETAILED DESCRIPTION OF THE PRESENT INVENTION

Specific embodiments of the present invention are further described below with reference to drawings.

An electromechanical-linkage hydraulic control gate valve actuator is implemented. The actuator includes a hydraulic control gate valve 1, an explosion-proof motor 2, an actuator rack 3, a hand-operated speed-increasing gearbox assembly 4 and a bidirectional throttle valve 5. The structure of the actuator is as follows: the hand-operated speed-increasing gearbox assembly 4 is connected and fixed with the explosion-proof motor 2 through an inner hexagon screw 19; the hand-operated speed-increasing gearbox assembly 4 includes a hand-operated speed-increasing gearbox shell 6, a bearing 17, a framework oil seal 8, a bearing 119, a planet carrier body 10, a planetary gear 11, a planetary gear shaft 12, a planet carrier plate 13, a stop ring 14, a retaining ring for shaft 15, a button 16, a sun gear 17, an internal gear 18, an inner hexagon screw 19, a countersunk head screw 20 and a cushion cover 21, wherein in the hand-operated speed-increasing gearbox assembly 4, the sun gear 17 is disposed on a central line at one end of a planet carrier body 10 and is fixedly connected with the shaft of the explosion-proof motor 2; a central line at the other end of the planet carrier body 10 is fixedly connected with a handle through a bearing 119; and planetary gears 11 are symmetrically disposed on both sides of the planet carrier body 10, and are engaged with the internal gear 18 fixed to the hand-operated speed-increasing gearbox shell 6 through two planetary gear shafts 12.

Figure 1:
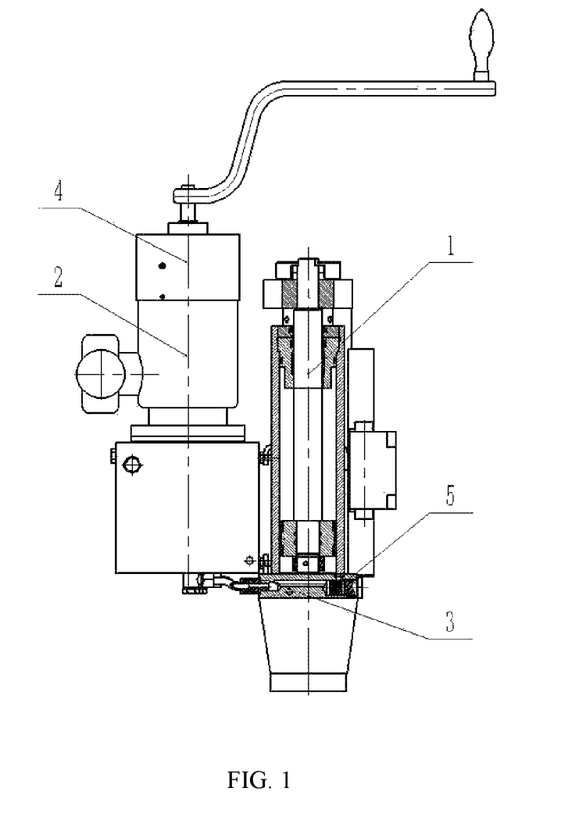
FIG. 1 is an overall structural schematic diagram of the present invention.
Figure 2:
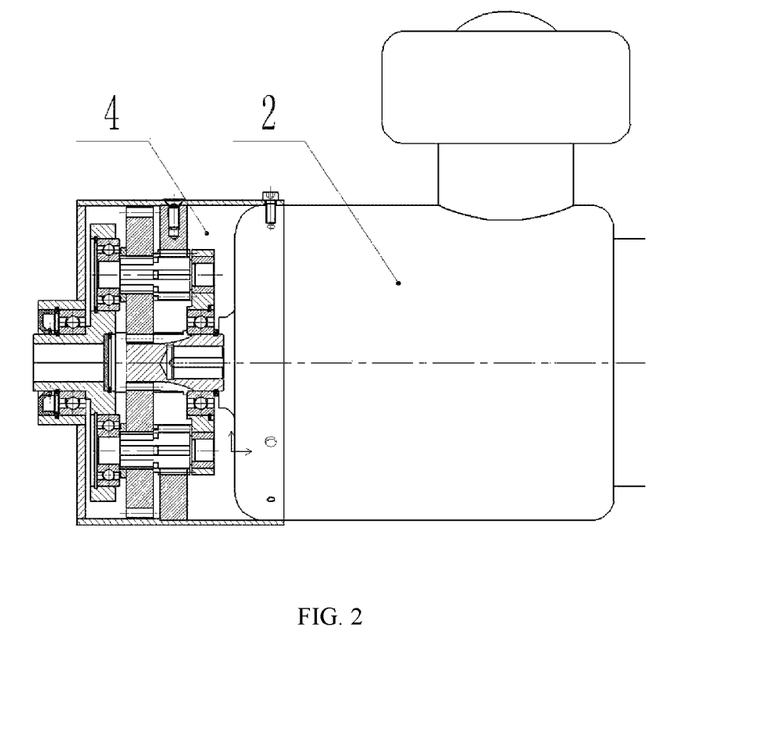
FIG. 2 is an amplified connection diagram of a speed-increasing gearbox assembly and an explosion-proof motor of the present invention.
Figure 3:
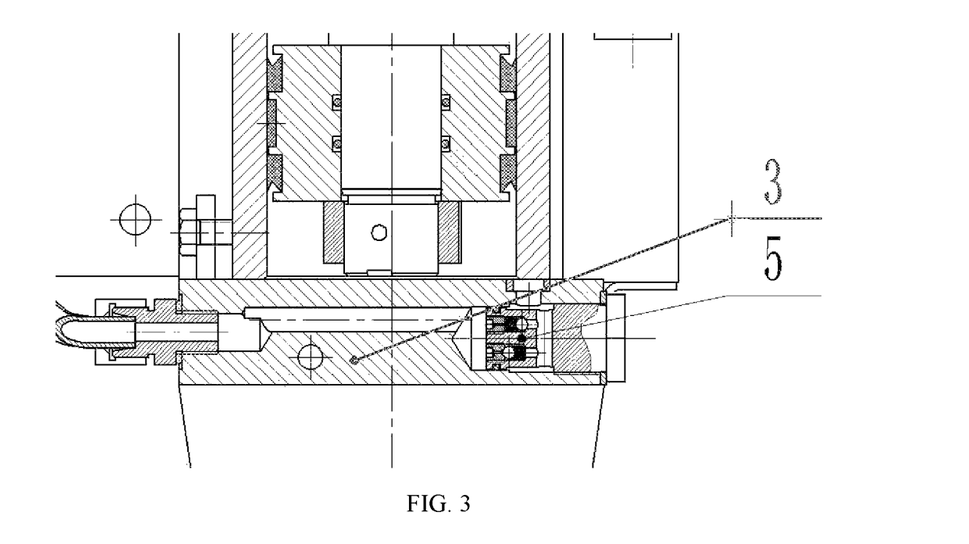
FIG. 3 is a local amplified diagram of a bidirectional throttle valve of the present invention.
Figure 4:
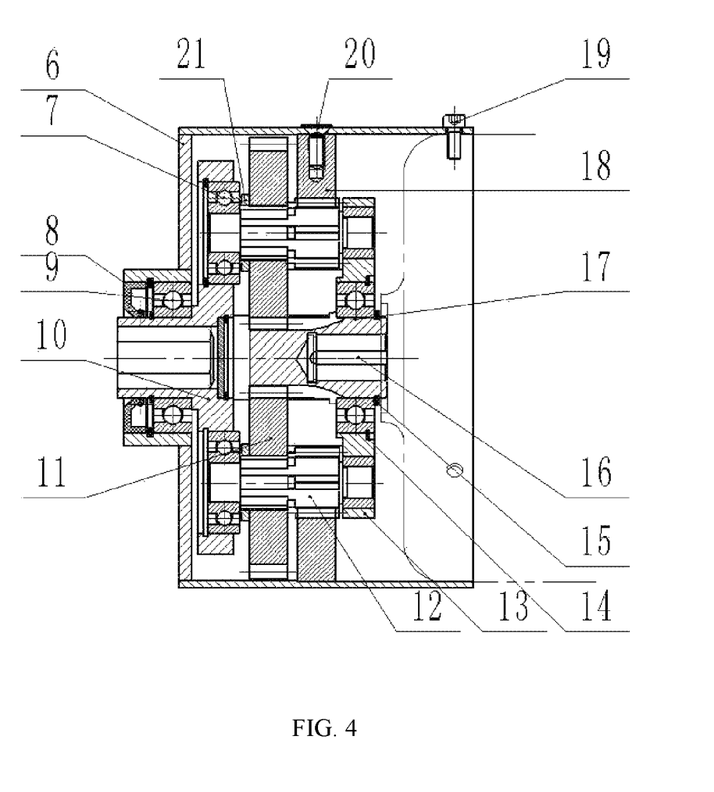
FIG. 4 is a structural schematic diagram of a hand-operated speed-increasing gearbox of the present invention.
Figure 5:
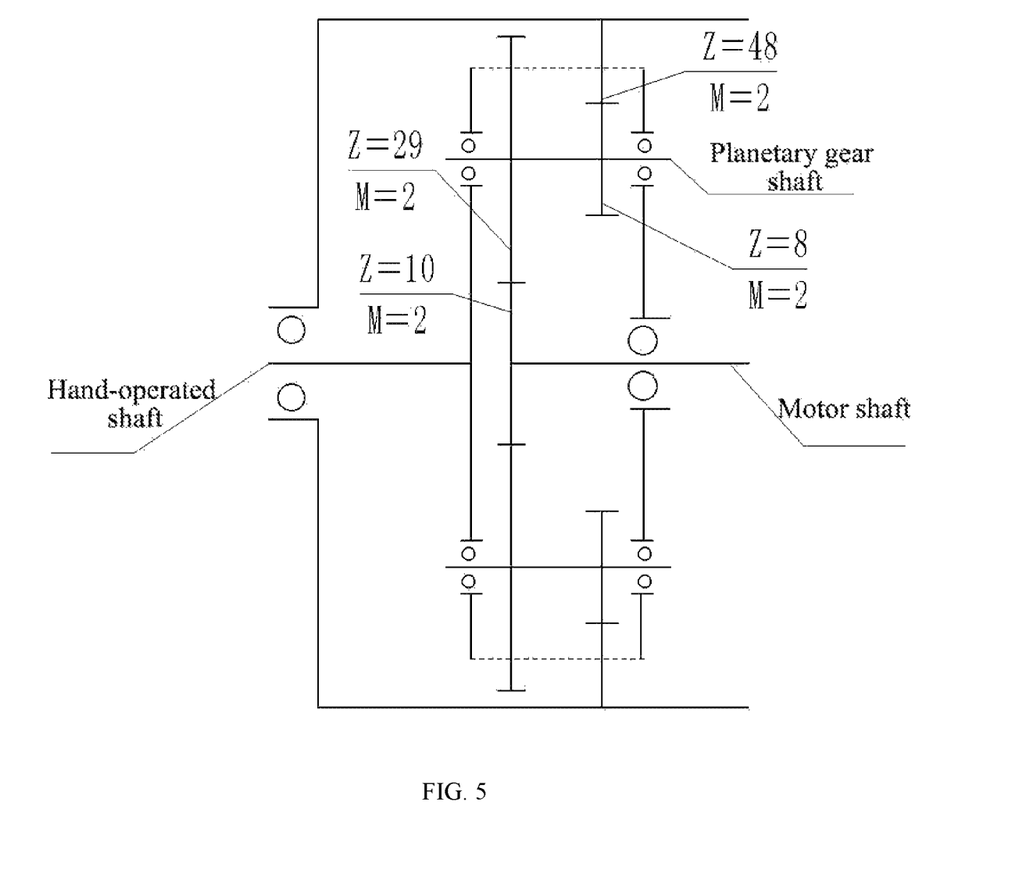
FIG. 5 is a structural schematic diagram of drive of a hand-operated speed-increasing gearbox of the present invention.
Figure 6:
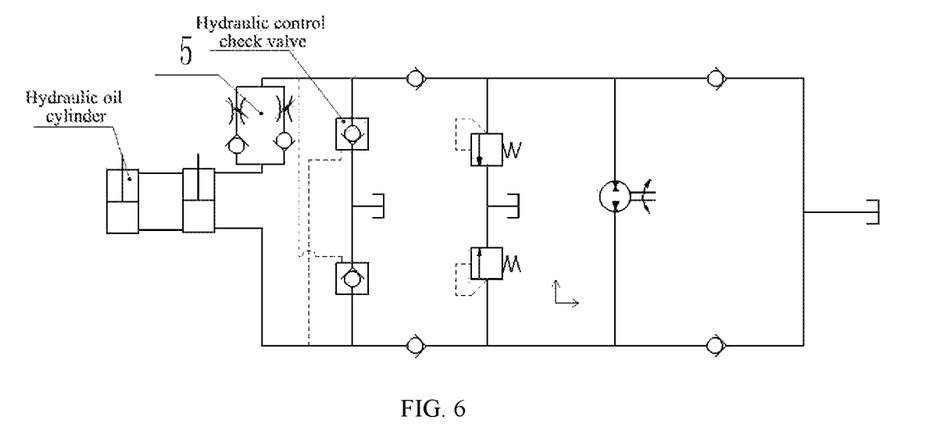
FIG. 6 is a principle diagram of a hydraulic system of the present invention.

In the above implementation solution, the bidirectional throttle valve 5 is installed in the lower part of the actuator rack 3, as shown in FIG. 3 and FIG. 6. One end of the bidirectional throttle valve 5 is communicated with a hydraulic oil cylinder, and the other end is communicated with a hydraulic control check valve. During operation, the actuator can regulate opening and closing speeds of the hydraulic control gate valve. Opening time and closing time are greater than 60 seconds, thereby effectively eliminating a water hammer accident under two states.

In the above implementation solution, when the hydraulic control gate valve is in a power failure situation, the hand-operated speed-increasing gearbox assembly 1 starts to operate. The planet carrier body 10 rotates by rotating a hand-operated handle; then the planetary gear shafts 12 are driven to rotate; the internal gear 18 does not rotate; the planetary gear shafts 12 rotate to drive the coaxial planetary gears 11; then the sun gear 17 is driven; and the speed-increasing ratio is regulated as 18.5. The structure of the hand-operated speed-increasing gearbox assembly 4 of the planetary gears 11 has the characteristics of fewer transmission stages, high efficiency, coaxial output and input and large transmission ratio.

The electromechanical-linkage hydraulic control gate valve actuator implemented above in the present invention is mainly used for occasions which need to control pipeline liquid, such as underground coal mines, large factories and petrochemical plants, and especially occasions which need to stably open and close the electro-hydraulic gate valve under emergency conditions such as repair and power failure.

A realization method of the electromechanical-linkage hydraulic control gate valve actuator implemented above is as follows.

As shown in FIG. 1 to FIG. 5, in the power failure situation, the hand-operated speed-increasing gearbox assembly 4 starts to operate. The planet carrier body 10 rotates by rotating the hand-operated handle; then the planetary gear shafts 12 are driven to rotate; the internal gear 18 does not rotate; the planetary gear shafts 12 rotate to drive the coaxial planetary gears 11; then the sun gear 17 is driven; and finally the sun gear 17 rotates together with a motor shaft, thereby driving the explosion-proof motor 2 in a hand-operated mode.

In the operating state of the electro-hydraulic gate valve, the water hammer phenomenon is generated when the electro-hydraulic gate valve is opened and closed, but is more serious when the electro-hydraulic gate valve is closed. The bidirectional throttle valve 5 can control the speeds in two states of opening and closing the electro-hydraulic gate valve, so that the opening time and the closing time of the electro-hydraulic gate valve are greater than 60 seconds, thereby effectively eliminating the water hammer phenomenon under two states. Small-hole throttling valve cores in the bidirectional throttle valve are replaceable. Different apertures correspond to different speeds. Therefore, the speeds are regulated in an operating way of replacing different small-hole throttling valve cores.

What is claimed is:

1. An electromechanical-linkage hydraulic control gate valve actuator, comprising an explosion-proof motor, a hydraulic control gate valve and an actuator rack; wherein the electromechanical-linkage hydraulic control gate valve actuator further comprises a hand-operated speed-increasing gearbox assembly (4); a sun gear (17) of the hand-operated speed-increasing gearbox assembly (4) is connected with the explosion-proof motor (2) through a shaft; the electromechanical-linkage hydraulic control gate valve actuator further comprises a bidirectional throttle valve (5) installed in a lower part of the actuator rack (3); and one end of the bidirectional throttle valve (5) is communicated with a hydraulic oil cylinder, and the other end is communicated with a hydraulic control check valve;

in the hand-operated speed-increasing gearbox assembly (4), the sun gear (17) is disposed on a central line at one end of a planet carrier body (10) and is connected with the shaft of the explosion-proof motor (2); a central line at the other end of the planet carrier body (10) is connected with a handle through a bearing (9); and planetary gears (11) are symmetrically disposed on both sides of the planet carrier body (10), and are engaged with an internal gear (18) fixed to a hand-operated speed-increasing gearbox shell (6) through two planetary gear shafts (12);

the planetary gears (11) revolve around the central line of the internal gear (18), and rotate around the planetary gear shafts (12);

the two planetary gears (11), the sun gear (17), the two planetary gear shafts (12) and the internal gear (18) respectively have tooth numbers of 29, 10, 8 and 48, and have moduli of 2;

the hand-operated speed-increasing gearbox assembly (4) has a speed-increasing ratio of 18.5; and opening and closing speeds of the hydraulic control gate valve are regulated and controlled through the bidirectional throttle valve (5).

\* \* \* \* \*